(12) United States Patent
Wang et al.

(10) Patent No.: US 12,251,722 B2
(45) Date of Patent: Mar. 18, 2025

(54) SPRAYER COMPRISING DETECTION SYSTEM FOR EARLY POWER-OFF

(71) Applicant: PixArt Imaging Inc., Hsin-Chu (TW)

(72) Inventors: Chih-Hao Wang, Hsin-Chu (TW);
Yang-Ming Chou, Hsin-Chu (TW);
Chien-Yi Kao, Hsin-Chu (TW);
Shih-Jen Lu, Hsin-Chu (TW);
Chih-Ming Sun, Hsin-Chu (TW);
Hsin-Yi Lin, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 434 days.

(21) Appl. No.: 17/840,596

(22) Filed: Jun. 14, 2022

(65) Prior Publication Data
US 2022/0305510 A1 Sep. 29, 2022

Related U.S. Application Data

(63) Continuation-in-part of application No. 17/144,080, filed on Jan. 7, 2021, now Pat. No. 11,867,498.

(60) Provisional application No. 62/963,189, filed on Jan. 20, 2020.

(51) Int. Cl.
*B05B 12/08* (2006.01)
*G01F 23/292* (2006.01)
*G01F 23/296* (2022.01)

(52) U.S. Cl.
CPC .......... *B05B 12/081* (2013.01); *G01F 23/292* (2013.01); *G01F 23/296* (2013.01)

(58) Field of Classification Search
CPC .. A61M 2205/3306; A61M 2205/3386; A61M 2205/276; G01J 2001/444; G01V 8/20;
G01F 23/00; G01F 23/292; G01F 23/296; G01B 11/22; B05B 17/0676; B05B 12/081; B05B 12/004
See application file for complete search history.

(56) References Cited

U.S. PATENT DOCUMENTS

| | | | | |
|---|---|---|---|---|
| 7,934,703 | B2 * | 5/2011 | Tomono | A61M 11/048 261/DIG. 65 |
| 10,520,300 | B2 * | 12/2019 | MacLean | G01B 11/22 |

FOREIGN PATENT DOCUMENTS

| | | |
|---|---|---|
| CN | 203578103 U | 5/2014 |
| CN | 103889488 A | 6/2014 |
| CN | 203750763 U | 8/2014 |
| CN | 106999970 A | 8/2017 |
| CN | 109414717 A | 3/2019 |

* cited by examiner

*Primary Examiner* — Christopher R Dandridge
(74) *Attorney, Agent, or Firm* — Winston Hsu

(57) ABSTRACT

A sprayer includes: a container; a passage including a transparent window, a first opening, a second opening and a resonator, wherein when liquid in the container is passed through the resonator via the first opening, the liquid is emitted as a gas via the second opening; and a removable detection unit disposed outside of the passage. The removable detection unit includes: a light source for illuminating the gas in the passage; an optical sensor disposed to detect a parameter of light reflected by the gas; and a processor coupled to the optical sensor for stopping the resonator from generating the gas when the parameter is below a threshold. The passage further includes a cavity disposed on a bottom surface of the passage in front of the optical sensor, wherein when the gas in the passage contacts the bottom surface, resultant water vapour will enter the cavity.

17 Claims, 4 Drawing Sheets

SPRAYER COMPRISING DETECTION SYSTEM FOR EARLY POWER-OFF

CROSS REFERENCE TO RELATED APPLICATIONS

This application is a continuation-in-part of U.S. application Ser. No. 17/144,080, filed on Jan. 7, 2021, which claims the benefit of U.S. Provisional Application No. 62/963,189, filed on Jan. 20, 2020. The contents of these applications are incorporated herein by reference.

BACKGROUND OF THE INVENTION

1. Field of the Invention

The present invention is directed to sprayers, and more particularly, to a detection system for a sprayer which uses a light-sensitive sensor to detect an average intensity of a gas emitted by an internal resonator of the sprayer in order to initiate power-off of the resonator.

2. Description of the Prior Art

In a sprayer, a liquid container holds liquid to be vaporized. The sprayer further contains an ultrasonic resonator, which is disposed in a lower part of the liquid container. A standard implementation of the ultrasonic resonator is a fine mesh containing a plurality of tiny holes. The liquid passes through the tiny holes while the fine mesh resonates at a high frequency (such as ultrasonic), which causes the liquid to be emitted as a gas. When little or no liquid is being passed through the mesh, the ultrasonic resonator is at risk of damage. Prior art technologies therefore detect the absence of liquid in the liquid container, or detect when liquid levels are low, and power-off the resonator according to the detection.

A conventional technique for determining a low or zero level of liquid in the container is to dispose two separate electrodes on the mesh. When liquid levels are sufficient to cover the mesh then there will be a connection formed between the electrodes, i.e. the electrodes are conductive. When liquid levels are too low or empty such that no liquid or insufficient liquid covers the mesh, the electrodes will not be conductive.

One issue that exists in the prior art is that, even when there is no liquid in the container, there may be bubbles left over from the resonated liquid which cover the mesh. This results in the electrodes being conductive although the liquid levels are not sufficient for the ultrasonic resonator to generate a gas output. The resonator will therefore not be powered off even though there is no liquid in the container, meaning the resonator will be damaged.

SUMMARY OF THE INVENTION

This in mind, it is an objective of the present invention to provide a system and method for a diffuser that can perform early detection of low liquid levels in the diffuser by detecting an intensity of the gas output.

This is achieved by a sprayer comprising a removable detection unit for determining when a liquid level of the sprayer falls below a specific level. The sprayer comprises: a container arranged to contain liquid; a passage comprising a transparent window, a first opening, a second opening and a resonator, wherein when the liquid in the container is passed through the resonator via the first opening, the liquid is emitted as a gas via the second opening; and a removable detection unit disposed outside of the passage. The removable detection unit comprises: a light source disposed to emit light through the light transparent window for illuminating the gas in the passage such that the gas will reflect the emitted light; an optical sensor disposed to detect a parameter of the reflected light through the transparent window; and a processor coupled to the optical sensor for stopping the resonator from generating the gas when the parameter of the reflected light is below a first threshold corresponding to the specific level. The passage further comprises a cavity disposed on a bottom surface of the passage in front of the optical sensor of the removable detection unit. When the gas in the passage contacts the bottom surface, resultant water vapour will enter the cavity.

When the detection unit is removable, the detection unit comprises a first contact plug and a second contact plug, the sprayer comprises a third contact plug and a fourth contact plug, the switch is coupled to the processor via the second contact plug and the fourth contact plug, and the resonator is coupled to the processor via the first contact plug and the third contact plug. The detection unit further comprises a transparent window disposed opposite the transparent window of the passage. The container may also be removable.

The light source may be an LED positioned next to the optical sensor, and may emit infrared light. The optical sensor may be a CMOS image sensor, a CCD image sensor or a photodetector. The detected parameter may correspond to an average intensity of particles in the gas, and/or may be directly proportional to a liquid level within the sprayer. The optical sensor may be arranged to sense light of a specific wavelength or to sense light of a range of wavelengths.

The removable detection unit comprises a power supply for providing power to the processor, the optical sensor and the light source, and the sprayer further comprises a switch for powering on or powering off the sprayer, wherein the switch is coupled to the processor. The resonator is coupled to the power source via the processor.

The processor can further compare the parameter of the reflected light with a second threshold, wherein the second threshold corresponds to a low liquid level within the container, and the first threshold corresponds to a zero liquid level within the container. When the parameter of the reflected light is below the second threshold and above the first threshold, the sprayer generates a signal. The signal may be a light signal or an audio signal. The second threshold can be adjusted automatically by the processor, or adjusted by a user.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is a diagram of a detection unit attached to a sprayer according to a first exemplary embodiment of the present invention.

FIG. 2 is a diagram of the detection unit attached to a sprayer according to a second exemplary embodiment of the present invention.

FIG. 4 is a diagram of the detection unit attached to a sprayer according to a third exemplary embodiment of the present invention.

DETAILED DESCRIPTION

Figure 3:
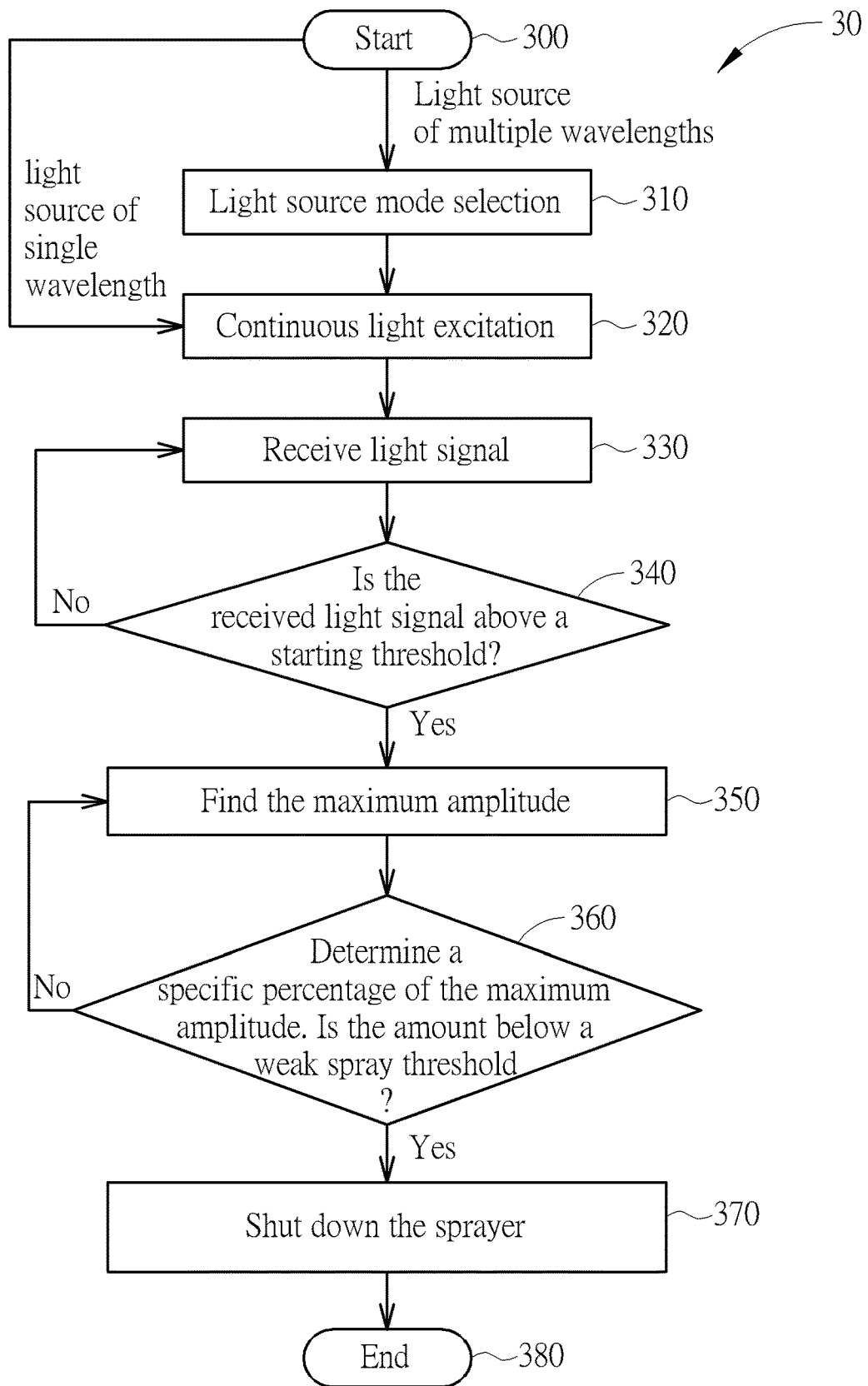
FIG. 3 is a flowchart of a method according to an exemplary embodiment of the present invention.

The present invention provides a detection unit for a sprayer, which uses a particle density of the emitted gas to determine when a liquid level of the sprayer is too low. This can prevent the erroneous determination of sufficient liquid levels which exists in the prior art. In addition, the present invention provides a more flexible design wherein the detection unit is attached to the outside of the sprayer in a removable manner.

The detection unit comprises a sensor, such as a CMOS sensor or a photo detector (e.g. a photodiode), as well as a light source. The light source emits light to illuminate the emitted gas, allowing the sensor to detect a density of particles according to the received light intensity of the light illuminated through the gas. As will be appreciated by one skilled in the art, when a liquid level in the container falls below a certain level, the emitted gas will comprise very few particles and will therefore have low density.

Insufficient liquid levels in the container can be determined by setting a threshold for particle density which corresponds to a number of particles emitted by the sprayer. A processor in the detection unit coupled to the CMOS sensor can operate to control all functions of the CMOS sensor. By further coupling the processor to the resonator in a wired or wireless manner, certain operations of the resonator such as power-on/power-off can be controlled. In particular, this allows the processor to power-down the resonator when a density of particles detected in the emitted gas falls below a predetermined threshold, indicating that a liquid level within the container is below a particular level.

Figure 1:
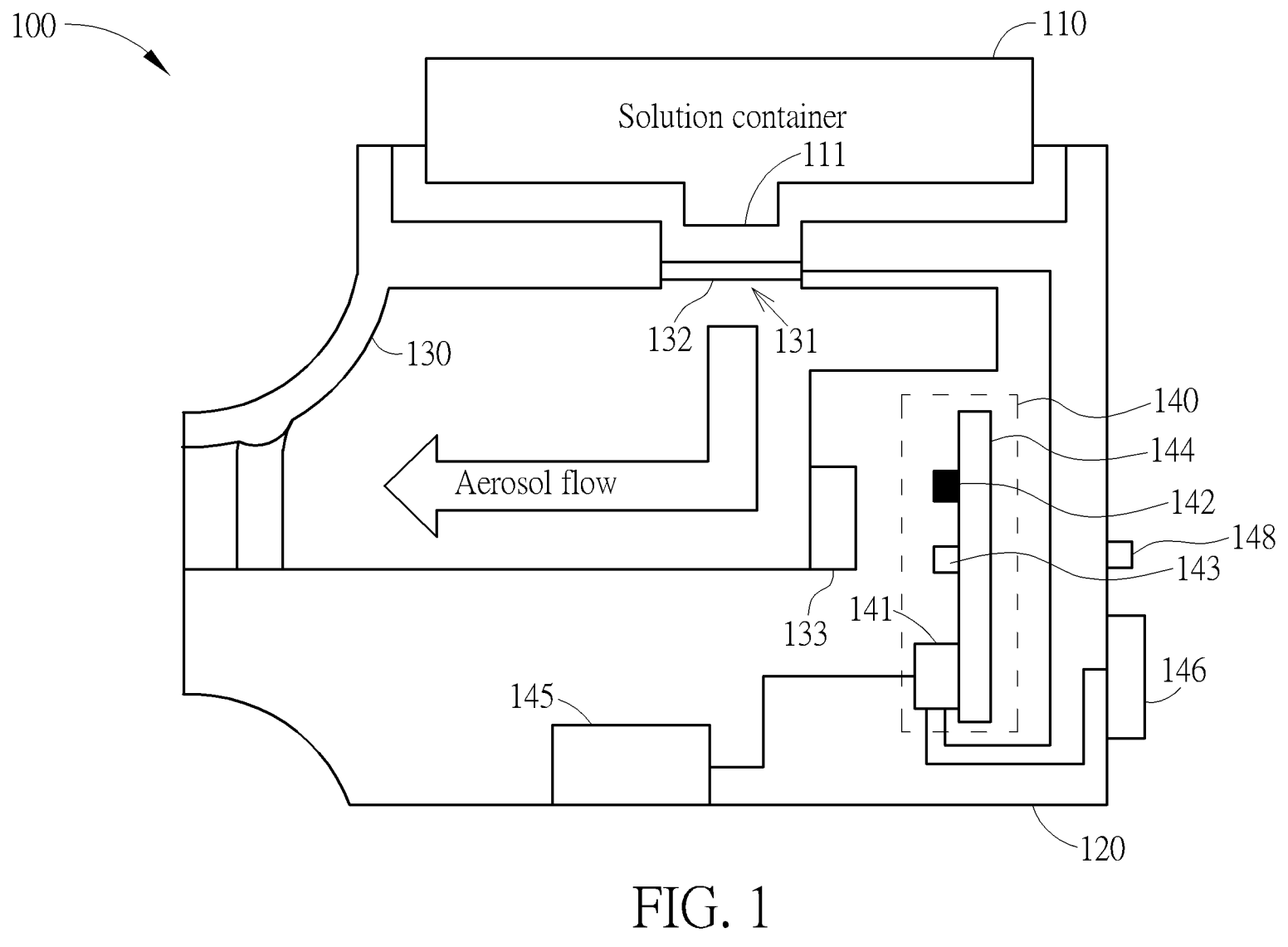

Refer to FIG. 1, which is a diagram of a sprayer 100 according to a first exemplary embodiment of the present invention. The sprayer 100 comprises a container 110 and a body 120, wherein the container 110 is removable from the body 120 and the container 110 has an opening 111 to release the liquid.

The body 120 includes a passage 130 for the aerosol (gas) flow, and a detection unit 140 comprising a processor 141, a sensor 142 and a light source 143 assembled in a substrate 144. The passage 130 has an opening 131 facing the opening 111 of the container 110 for receiving the liquid from the container 110. A resonator 132 is disposed in the opening 131 to vaporize the liquid from the container 110 into gas. The light source 143 illuminates the gas and the illuminated gas is reflected by the passage 130 and detected by the sensor 142. The processor 141 receives light information (such as an intensity value) from the sensor 142, wherein the processor 141 may be a DSP, an MCU or any hardware capable of calculating digital or analog signals. The sensor 142 may be a CMOS image sensor or a photodiode capable of detecting light emitted by the light source 143. The light source 143 may be an LED or a Laser capable of emitting light to the passage 130.

A power source 145 provides power (current) to the substrate 144, and therefore operates to power the processor 141, the sensor 142, and the light source 143. The processor 141 is electrically coupled to the sensor 142, the light source 143 and the resonator 132 to control operations of the sensor 142, the light source 143 and the resonator 132.

A switch 146 maybe disposed on the outer surface of the sprayer 100 to allow a user to power-on/off the sprayer 100. In this case, the switch 146 is also electrically coupled to the processor 141 so that, when a user powers-on or powers-off the sprayer 100, the processor 141 will turn on/off the sensor 142, the light source 143 and the resonator 132 accordingly. As shown in FIG. 1, the processor 141 is also electrically coupled to the resonator 132, allowing the processor 141 to directly power-off the resonator 132 when a low or zero liquid level of the container 110 is detected.

FIG. 2 illustrates a sprayer 200 according to a second exemplary embodiment of the present invention, wherein both the detection unit 240 and the container 110 are removable. As the processor 141 is disposed in the detection unit 240 and therefore cannot be directly coupled to the resonator 132 which is in the body 120 of the sprayer 200, the body 120 further includes contact pins 132*a* (coupled to the resonator 132) and 146*a* (coupled to the switch 146), and the detection unit 240 further includes contact pins 141*a* and 141*b* (coupled to the processor 141), enabling an electronic connection between the processor 141, the resonator 132 and the switch 146.

As illustrated in FIG. 1 and FIG. 2, the passage 130 includes a light transparent window 133 facing the sensor 142 and the light source 143 to allow light emitted by the light source 143 to pass through and illuminate the emitted gas, as well as allowing the sensor 142 to detect the illuminated gas. When the detection unit 240 is removable as shown in FIG. 2, the detection unit 240 also comprises a light transparent window 147 facing the light transparent window 133.

By illuminating the emitted gas with the light source 143 and detecting light information by the sensor 142, the average intensity of the received light from the sensor 142 can be calculated by the processor 141, enabling the processor 141 to determine the average density of the gas. Although the invention is not restricted to detecting a particular gaseous suspension, the particles suspended in the emitted gas should be large enough to influence the density of the gas when illuminated by the light source.

When the gas is illuminated with the light source 143, the light will be reflected by the gas, with an amount/intensity of reflected light according to the density of the gas. If the gas is very dense then the reflected light will be of a high intensity; as the density of the gas decreases, so will the intensity of the reflected light. At least one threshold corresponding to a specific intensity of reflected light (preferably a low intensity) is set. When the reflected light falls below this threshold, it can be determined that the liquid level within the diffuser has become low enough such that an insufficient number of particles are emitted causing the gas to become less dense. At this point, the processor 141 can determine to power-off the resonator 132.

As different liquids will have different densities when emitted as a gas, it is possible to set multiple thresholds corresponding to different liquids. In this case, the processor can be set to detect a particular threshold corresponding to a particular liquid by being set in a particular mode. Furthermore, it is also possible to set multiple thresholds corresponding to different densities of a same gas. As detailed in the background, when there is a low level liquid in the container 110, the resonator 132 can still emit a gas and therefore will not be immediately damaged; when the liquid level in the container is almost zero, the resonator 132 is in immediate danger of being damaged. By setting a first threshold corresponding to the first situation, and setting a second threshold corresponding to the second situation, an intensity of the emitted gas falling below the first threshold can be used to inform a user that liquid in the container 110 should be replaced, but will not result in immediate power-off of the resonator 132.

In the above situation, the user may be informed that liquid levels in the container 110 are getting low by emitting a sound or activating a visual indicator such as an LED 148, which is illustrated as positioned above the switch 146, but is not limited therein. The LED 148 can be controlled by the processor 141 upon receiving feedback from the sensor 142.

Figure 2:
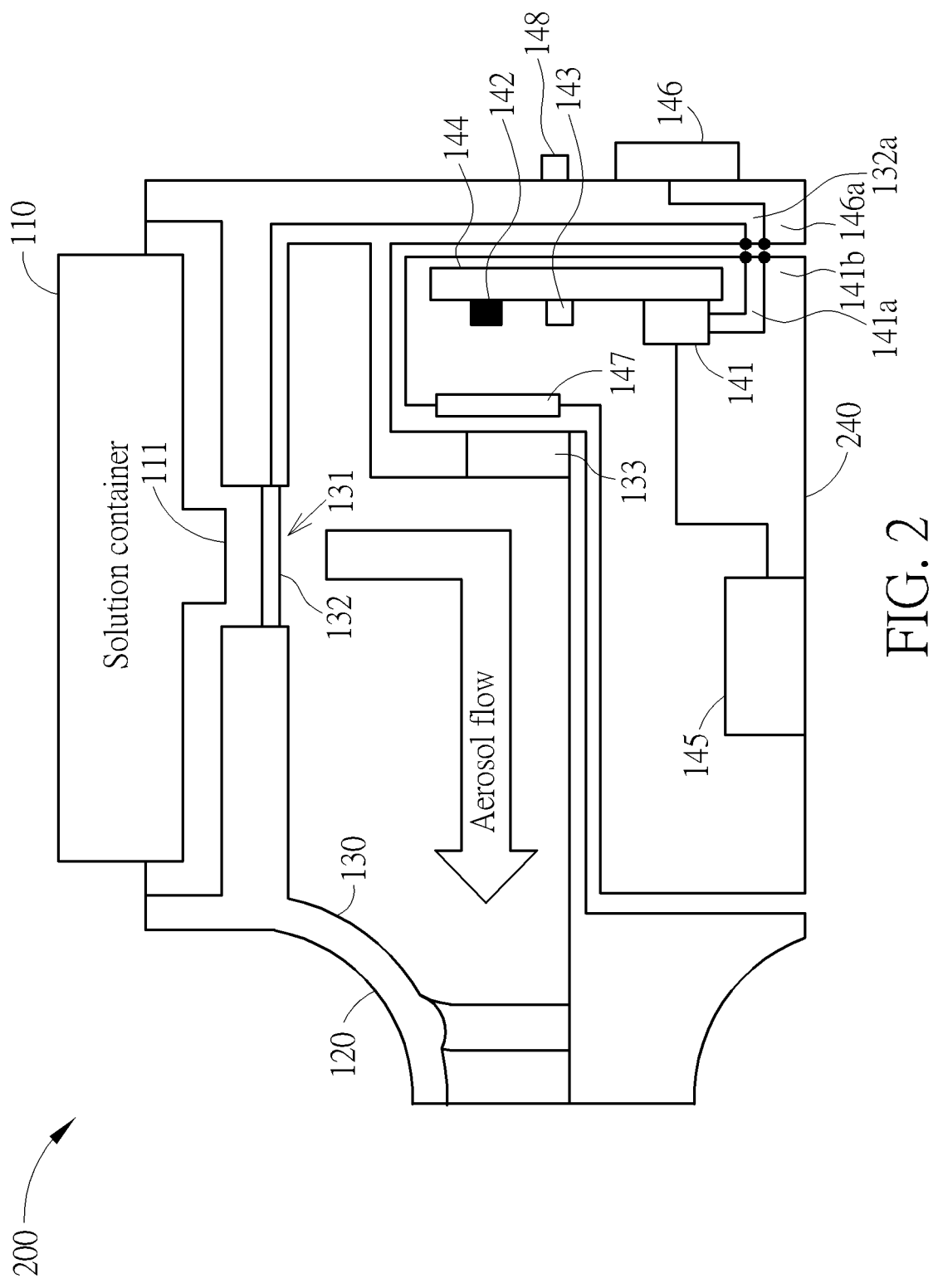

As shown in FIG. 1, the container 110 is removable from the body 120 of the sprayer 100. As shown in FIG. 2, both the container 110 and the detection unit 240 are removable from the body 120 of the sprayer 200. This allows for more flexibility in design. In both embodiments, the internal surface of the passage 130 should not be highly reflective as this will cause the reflected light intensity to give an erroneous result with regards to the light intensity.

In both an operation mode where only one threshold is set and an operation mode where multiple thresholds are set, the processor 141 will directly stop the resonator 132 from generating the gas when a parameter of the received light is below a threshold corresponding to a low liquid level meaning the resonator 132 is in imminent danger of being damaged. For example, the processor 141 determines if the intensity level of the reflected light received by the sensor 142 is lower than a threshold, and identifies the liquid level as being insufficient when the intensity level is lower than the threshold. The threshold may be able to be manually adjusted by a user, or automatically adjusted when the processor receives the information of the liquid through a wired connection port (ex, USB) or wireless connection (ex, Bluetooth).

In addition, a further threshold corresponding to a change in the sensor signal can be set, which indicates that the container 110 and/or the detection unit 240 have been removed. In both cases, removal of the corresponding unit will result in no gas or a significantly reduced amount of gas passing in front of the light transparent window 147 and sensor 142. This detection can be used to automatically power down the sprayer to save power or, in another embodiment, this detection can result in a warning signal/sound indicating that components of the sprayer are not properly connected.

In one embodiment, the light source 143 is infrared (IR) light, as this will be invisible to a user and will therefore not influence or affect the user in any negative way. In another embodiment, it is also possible for the light source 143 to comprise a plurality of light sources which emit light of multiple wavelengths, and the sensor 142 may detect different light intensity information corresponding to these different wavelengths, which enables the processor 141 to analyze the dense of the gas more precisely. In one embodiment, ultrasound waves may be used instead of infrared waves.

A standard size of the particle which can be detected is 5 micrometers. In one embodiment, the detection unit 140/240 is only able to detect a specific particle size. In another embodiment, the detection unit 140/240 may be able to detect particles over a range of sizes. In this case, the sensor may be instructed as to which size particle is to be detected, and a detection range of the sensor is set accordingly.

Once the resonator 132 is powered-off by the processor 141 so that no gas is emitted, the sensor 142 and the light source 143 may then be reset or powered-off correspondingly.

The above structure may also be applied to a system for detecting the cleanliness/purity of air. As is well-known, micro-particles such as 2.5 and 5 are present in air which indicates pollution. The above embodiment can thereby be applied to a system for testing the pollution index of air.

Refer to FIG. 3, which is a flowchart detailing an operation of the sensor 143 and the processor 141 for the sprayer 100/200. Note that the flow is not limited to the steps detailed below; other steps maybe inserted, some steps maybe deleted, and the order of the steps may be changed provided that the method detects a density of the emitted gas and uses that to control an operation of the sprayer.

The flow is as follows:
Step 300: Start. If light of multiple wavelengths is provided, go to Step 310; if light of a single wavelength is provided, go to Step 320.
Step 310: Light source mode selection.
Step 320: Continuous light excitation.
Step 330: Receive light signal.
Step 340: Is the received light signal above a starting threshold? If yes, go to Step 350; if no, return to Step 330.
Step 350: Find the maximum amplitude.
Step 360: Determine a specific percentage of the maximum amplitude. Is the amount below a weak spray threshold? If yes, go to Step 370; if no, go back to Step 350.
Step 370: Shut down the sprayer.
Step 380: End.

The above procedure details a detection unit for a sprayer which can utilize particle density of an emitted gas to determine when a liquid level in the sprayer is low or zero. The detection unit can use this detection result to power-off the resonator, thereby preventing damage to the resonator.

One issue which can arise when the gas travels through the passage is that water vapour will be formed at the points of contact with the inner surface of the passage. When this occurs in the area directly in front of the sensor, the resultant water vapour may affect the visibility and therefore sensitivity of the sensor, possibly resulting in erroneous detection.

Figure 4:
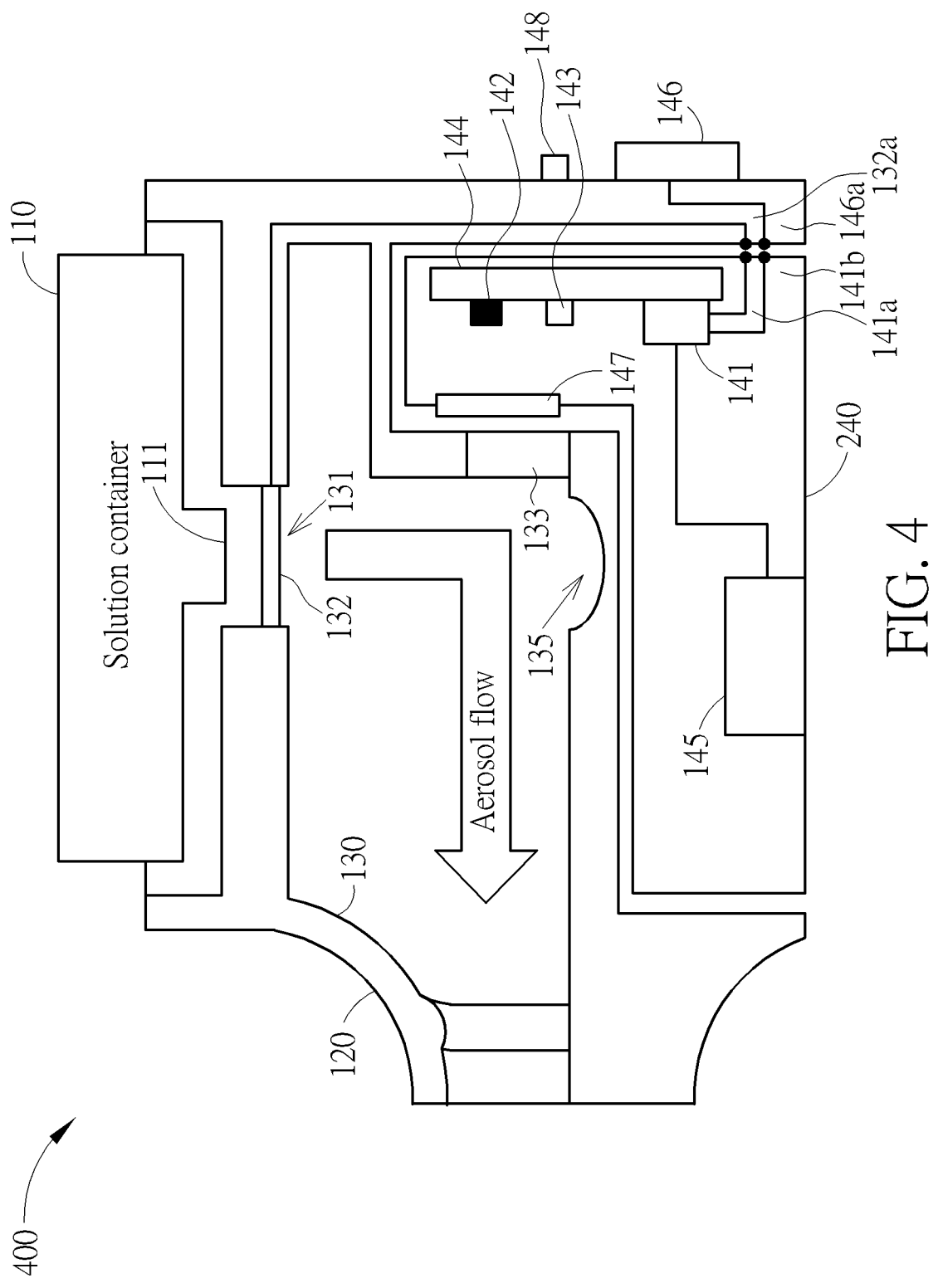

In order to maintain sensitivity of the sensor even when water vapour is formed within the passage, a sprayer 400 according to a third exemplary embodiment is provided, as illustrated in FIG. 4. Same numerals are used for same components shown in FIG. 2 for the sake of brevity. As in the embodiment illustrated in FIG. 2, both the container 110 and the detection unit 240 are removable; the body 120 therefore includes the contact pin 132a coupled to the resonator 132 and contact pin 146a coupled to the switch 146, and the detection unit 240 includes contact pins 141a and 141b coupled to the processor 141, and the detection unit 240 also comprises the light transparent window 147 facing the light transparent window 133.

The difference between the embodiment illustrated in FIG. 4 and the embodiment illustrated in FIG. 2 is that the passage 130 includes a cavity 135 formed on the bottom surface of the passage 130 and positioned in front of the light transparent window 133. This cavity 135 is also positioned directly below the opening 131. When the gas moves through the passage 130 as illustrated by the arrow 'aerosol flow', water vapour maybe formed on the bottom inner surface of the passage 130 due to differences in the temperature of the gas and the surface temperature of the passage 130. The resultant water vapour may directly form on the light transparent window 133, or at least form in the space in front of the light transparent window 133, thereby reducing the sensitivity of the sensor 142.

By providing the cavity 135, any water vapour formed within the passage 130 will drop into the cavity 135 due to gravity, and will therefore be below the bottom level of the light transparent window 133, so the sensor 142 can have an unobstructed view of the illuminated gas. This maintains the sensitivity of the sensor 142, such that the sprayer 400 can accurately detect a particle density of the emitted gas and use said particle density to determine when a liquid level of the sprayer is too low.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sprayer comprising a detection unit for determining when a liquid level of the sprayer falls below a specific level, the sprayer comprising:

a container arranged to contain the liquid;

a passage comprising a first light transparent window, a first opening, a second opening and a resonator, wherein when the liquid in the container is passed through the resonator via the first opening, the liquid is emitted as a gas via the second opening; and a removable detection unit disposed outside of the passage and comprising:

a light source disposed to emit a light through the first light transparent window for illuminating the gas in the passage such that the gas will reflect the emitted light;

an optical sensor disposed to detect a parameter of the reflected light through the first light transparent window; and a processor coupled to the optical sensor for stopping the resonator from generating the gas when the parameter of the reflected light is below a first threshold corresponding to the specific level;

wherein the passage further comprises a cavity disposed on a bottom surface of the passage in front of the optical sensor of the removable detection unit, wherein when a water vapour is formed by some of the gas in the passage directly contacting the bottom surface, the resultant water vapour will enter the cavity so that the water vapour will not be detected by the optical sensor.

2. The sprayer of claim 1, further comprising a switch, wherein the detection unit comprises a first contact plug and a second contact plug, the sprayer comprises a third contact plug and a fourth contact plug, the switch is coupled to the processor via the second contact plug and the fourth contact plug, and the resonator is coupled to the processor via the first contact plug and the third contact plug.

3. The sprayer of claim 1, wherein the detection unit comprises a second light transparent window disposed opposite the first light transparent window of the passage.

4. The sprayer of claim 1, wherein the light source is an LED and is positioned next to the optical sensor.

5. The sprayer of claim 4, wherein the LED emits infrared light.

6. The sprayer of claim 1, wherein the container is removable.

7. The sprayer of claim 1, wherein the detection unit comprises a power supply for providing power to the processor, the optical sensor and the light source, and the sprayer further comprises a switch for powering on or powering off the sprayer, wherein the switch is coupled to the processor.

8. The sprayer of claim 7, wherein the resonator is coupled to the power source via the processor.

9. The sprayer of claim 1, wherein the optical sensor is a CMOS image sensor, a CCD image sensor or a photodetector.

10. The sprayer of claim 1, wherein the processor can further compare the parameter of the reflected light with a second threshold, the second threshold corresponds to a low liquid level within the container, the first threshold corresponds to a zero liquid level within the container, and when the parameter of the reflected light is below the second threshold and above the first threshold, the sprayer generates a signal.

11. The sprayer of claim 10, wherein the signal is a light signal.

12. The sprayer of claim 10, wherein the signal is an audio signal.

13. The sprayer of claim 10, wherein the second threshold can be adjusted automatically by the processor, or adjusted by a user.

14. The sprayer of claim 1, wherein the parameter corresponds to an average intensity of particles in the gas.

15. The sprayer of claim 1, wherein the parameter is directly proportional to a liquid level within the sprayer.

16. The sprayer of claim 1, wherein the optical sensor is arranged to sense light of a specific wavelength.

17. The sprayer of claim 1, wherein the optical sensor is arranged to sense light of a range of wavelengths.

* * * * *